(12) United States Patent
Ruggiano et al.

(10) Patent No.: US 8,279,113 B2
(45) Date of Patent: Oct. 2, 2012

(54) METHOD FOR FILTERING A RADAR SIGNAL AFTER IT HAS BEEN REFLECTED BY A TARGET

(75) Inventors: Mayazzurra Ruggiano, Delft (NL); Emiel Stolp, Hengelo (NL)

(73) Assignee: Thales Nederland B.V., Hengelo (NL)

( * ) Notice: Subject to any disclaimer, the term of this patent is extended or adjusted under 35 U.S.C. 154(b) by 365 days.

(21) Appl. No.: 12/627,263

(22) Filed: Nov. 30, 2009

(65) Prior Publication Data
US 2010/0134345 A1 Jun. 3, 2010

(30) Foreign Application Priority Data
Nov. 28, 2008 (EP) .................................. 08170265

(51) Int. Cl.
*G01S 7/292* (2006.01)
*G01S 7/285* (2006.01)
*G01S 7/00* (2006.01)

(52) U.S. Cl. ............ 342/159; 342/89; 342/94; 342/175; 342/195

(58) Field of Classification Search ............ 342/89–103, 342/159–164, 175, 192–197, 25 R–25 F, 342/118, 134, 145, 147–154, 165, 173, 174
See application file for complete search history.

(56) References Cited

U.S. PATENT DOCUMENTS

| | | | | |
|---|---|---|---|---|
| 4,137,533 A * | 1/1979 | Briechle et al. | | 342/162 |
| 4,965,732 A * | 10/1990 | Roy et al. | | 342/153 |
| 5,231,404 A * | 7/1993 | Gasiewski | | 342/174 |
| 5,241,316 A * | 8/1993 | Pringle | | 342/174 |
| 5,805,107 A | 9/1998 | Schroth et al. | | |
| 6,525,545 B2 * | 2/2003 | Hill | | 342/118 |
| 7,003,029 B2 * | 2/2006 | Doetsch et al. | | 342/165 |
| 7,091,902 B2 * | 8/2006 | Liu et al. | | 342/174 |
| 7,106,250 B2 | 9/2006 | Blunt et al. | | |
| 7,249,730 B1 * | 7/2007 | Flippen, Jr. | | 342/173 |
| 7,298,315 B2 | 11/2007 | Gerlach et al. | | |
| 2005/0134499 A1 * | 6/2005 | Liu et al. | | 342/195 |
| 2008/0231500 A1 * | 9/2008 | Heikkila et al. | | 342/159 |

FOREIGN PATENT DOCUMENTS
EP 1136948 A1 9/2001

OTHER PUBLICATIONS

Ruggiano, et al, 2008. "Performance of reiterated LMMSE filtering and coded radar waveforms." 5th European Radar Conference, pp. 132-135.

Fornaro, et al, 2002. "Minimum mean square error space-varying filtering of interferometric SAR data." IEEE Transactions on Geoscience and Remote Sensing 40(1): 11-21.

* cited by examiner

*Primary Examiner* — Bernarr Gregory
(74) *Attorney, Agent, or Firm* — Stroock & Stroock & Lavan LLP

(57) ABSTRACT

A signal y is received by a radar, the signal y being the reflection of a signal s emitted by the radar, the signal s having been reflected by a target. A filter w is estimated and applied to the signal y, in which the filter w compensates for an unwanted and beforehand unknown distortion d in the emitted signal s.

12 Claims, 2 Drawing Sheets

METHOD FOR FILTERING A RADAR SIGNAL AFTER IT HAS BEEN REFLECTED BY A TARGET

The present application claims priority to European Patent Application Serial No. 08170265.6, filed on Nov. 28, 2008, which is hereby incorporated by reference in its entirety.

FIELD

The present invention relates to a method for filtering a signal y, the signal y being the reflection of a signal s emitted by a radar, the signal s having been reflected by a target. The invention is particularly applicable to radars.

BACKGROUND

A radar is a complex system that may actively transmit an electromagnetic waveform in the air and that may receive returns from echoes of this waveform modified by the environment. The returns can differ from the transmitted wave in terms of amplitude and phase shift: the reception scheme aims at extracting from these differences useful information on relevant objects in the environment usually called targets. The transmitted waveform and the antenna pattern are usually designed such as to allow extraction of specific and precise details. These serve a common objective for radar applications, which is to discern the targets from the environment or clutter, thermal noise and undesired signals such as jammers.

The useful information in a radar application is described from parameters such as range, angular position (azimuth/elevation) or Doppler frequency. These are used to distinguish a target from the environment and from unwanted signals. These are also used to distinguish between multiple targets in a scene; a spatial distribution of reflectors. The characteristics of the waveform and of the antenna pattern, such as bandwidth, observation time or beamwidth of the aperture illumination, determine the minimum separation, usually called resolution, between two returns from separate point sources in order for them to be distinguishable in each dimension (range, Doppler, and angular). Once returns are separated, they are attributed to one or multiple targets, or to clutter, or to jammers. Extended work has been done in the past for improvement of techniques to allow resolution between echoes.

In an attempt to allow for resolution between echoes in the azimuth dimension, standard techniques used are interpolation techniques. Separation of different object echoes is achieved by means of interpolating several discrete samples of processed returns, usually <<called hits>>, from a same object to locate the exact peak, corresponding to a good estimate of the true azimuth of the object. This peak can then be separated from another peak due to another object if a dip is present between the two peaks. Other techniques applied to extract the azimuth position of the object are beamforming and target/sidelobe subtraction. Beamforming is applied when antenna arrays are considered: different elements of the array can be combined accordingly to synthesize a spatial filter that allows, by virtue of a proper processing, separating two returns from different azimuth angles. Particular beamforming techniques include null steering that enable placing a notch at the azimuth angles where undesired returns arrive. Algorithms such as MUSIC (<<MUltiple Signal Classification>>) and Capon are applied in beamforming schemes to separate different closely spaced sources. Direction of arrival algorithms aim to derive from multiple receiver elements the location of an object generating the echo by means of deriving the phase difference between the echoes, at each element. Subtraction techniques are several methods that allow lowering or canceling sidelobes of the antenna pattern in order to be able to locate an object return even when closely positioned by a stronger one. Among these methods are the CLEAN techniques, applied either as beam-removing techniques or in the filtering as image-residue approach on the Doppler-delay plane, to subtract strong echoes from a combined return of multiple echoes superimposed in order to unmask weaker echoes. For the azimuth dimension, CLEAN techniques are applied using model matching maximum likelihood techniques. These apply stronger target cancellation to uncover weaker targets, by using an image-residue approach on the Doppler-delay plane. Unfortunately, drawbacks of the CLEAN algorithm are, among others, the need for a complete knowledge of the transmitted signal, the fact that it is a non linear procedure due to threshold procedure in following iterations, a hypothesis of deterministic sidelobe pattern, artifacts due to constructive/destructive interference due to contiguous targets or spacing closer than a resolution cell, hypothesis required on number of targets expected, a combinatorial approach and computational expense if many extended targets are present. It is an aim of the present invention to overcome at least some of these drawbacks.

In an attempt to allow for resolution between echoes in the range dimension, the standard technique used is CFAR (<<Constant False Alarm Rate>>) and pulse compression. This last technique is essentially applying a matched filter at reception when the transmitted signal is modulated in frequency or phase to obtain a large bandwidth. The sidelobe level of the output of the matched filter depends on the transmitted waveform. Sidelobe suppression techniques have been developed by designing coding schemes that generate low sidelobes, these are called spectral weighting or windowing. Other techniques are related to mismatched filtering as opposed to matched filtering. Mismatched filtering techniques can be based on different inverse filtering methods: some are based on weight selection for the filtering based on minimization of some sidelobe level parameter while others are based on least squares schemes or developed for particular coding schemes. Mismatched filtering techniques usually cause a widening and lowering of the mainlobe of the output of the filter, the latter named mismatch loss. Unknown distortion in the emitted signal raises these sidelobes. It is an aim of the present invention to overcome at least some of these drawbacks.

For the range dimension, Blunt and Gerlach developed the APC scheme (<<Adaptive Pulse Compression>>) as disclosed in the U.S. Pat. No. 7,106,250 and U.S. Pat. No. 7,298,315TBD respectively titled <<Robust Predictive Deconvolution Method and System>> and <<Radar Pulse Compression Repair>>. The APC scheme is an iterative method to generate a linear minimum mean square estimate filter given the received signal samples and the transmitted signal. It is an implementation of the Wiener filter for finite observation samples of the received signal. Unfortunately, a major drawback of the APC scheme proposed by Blunt and Gerlach is, among others, the need for a perfect knowledge of the output signal, while the actual output signal is bound to be distorted. Yet another drawback of the APC scheme is the need for a perfect target matching, the target having to be placed at the center of the range cell. Yet another drawback of the APC scheme is that the Doppler compensation algorithm depends on the waveform. Yet another drawback of the APC scheme is that the clutter and Doppler spread are not considered, hereby favoring target masking. It is an aim of the present invention to overcome at least some of these drawbacks.

A previous publication titled "Performance of Reiterated LMMSE Filtering and Coded Radar Waveforms" (Proceedings of the 5$^{th}$ European Radar Conference, Amsterdam, October 2008) discloses a method for filtering a radar signal after it has been reflected by a target. However, the method disclosed in this publication achieves only compensation for the sidelobes of the echoes of an unknown scene of multiple targets. The method disclosed fails at compensating for an unwanted and beforehand unknown distortion in the emitted signal.

BRIEF DESCRIPTION OF THE DRAWINGS

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

DETAILED DESCRIPTION

Figure 1:
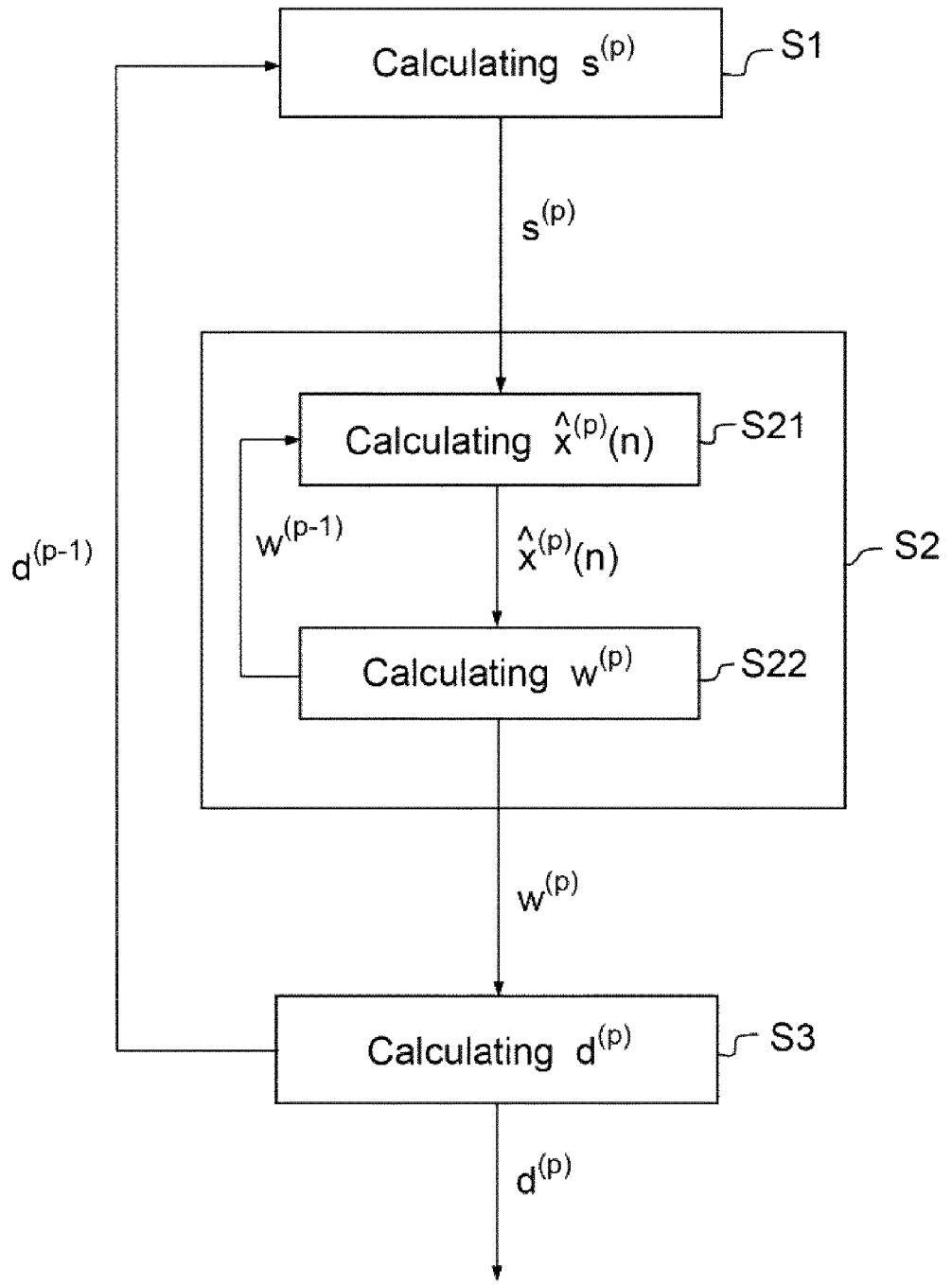
FIG. 1 illustrates the steps of an iterative method according to an embodiment of the invention.

The present invention aims to provide a method which may be used to overcome at least some of the drawbacks described above. In particular, it aims at compensating for an unwanted and beforehand unknown distortion. At its most general, the invention proposes a technique that applies to all waveforms and antenna patterns. The invention is an adaptive filtering technique based on output error minimization scheme and uncertainty-based modelling, an adaptive filter being obtained by linear minimum mean square error (LMMSE) estimation techniques applied iteratively on the received signal samples.

According to a first of its aspects, the present invention may provide a method for filtering a signal y, the signal y being the reflection of a signal s emitted by a radar, the signal s having been reflected by a target. The method comprises a step of receiving the signal y and a step of estimating a filter w to be applied to the signal y, the filter w being compensated for an unwanted and beforehand unknown distortion d in the emitted signal s.

Preferably, the target being located in a n$^{th}$ range resolution cell of the radar, where n is an integer, the emitted signal s may be a sampled signal $s=[s_0 \ldots s_{N-1}]^T$ containing N samples in the range dimension, N being an integer greater than or equal to 1, the sampled signal s satisfying $s=z+d$ where $z=[z_0 \ldots z_{N-1}]^T$ may be a reference template signal and $d=[d_0 \ldots d_{N-1}]^T$ may be the unwanted distortion. The signal y may be a sampled signal $\tilde{y}(n)=[y(n) \ldots y(n+N-1)]^T$ containing N samples corresponding to the measurement of the signal y in N consecutive resolution cells following the n$^{th}$ cell. The filter w may be a set of N weighting factors. The filter w may applied to y by calculating the convolution $w^H \tilde{y}(n)$.

Preferably, the step of estimating the filter w may comprise the following steps performed M times iteratively, M being an integer greater than or equal to 1 and p being an integer ranging from 1 to M:
- a step S1 of calculating, based on an estimated distortion $d^{(p-1)}$, a reference signal $s^{(p)}$;
- a step S2 of iteratively calculating, based on $s^{(p)}$, an estimated filter $w^{(p)}$;
- a step S3 of calculating, based on $w^{(p)}$, an estimated distortion $d^{(p)}$; the M$^{th}$ iteration of S3 providing $w^{(M)}=w$.

Preferably, during the step S1, $d^{(0)}=0$, $s^{(0)}=s$ and $s^{(p)}=s^{(p-1)}$ if Preferably, the sampled signal $\tilde{y}(n)$ satisfying $\tilde{y}(n)=A^T(n)s+\tilde{b}(n)$, where $\tilde{b}(n)=[b(n) \ldots b(n+N-1)]^T$ may be a hypothetical sampled signal representing a thermal noise b collected from N consecutive resolution cells following the n$^{th}$ cell and A(n) may be a N×N matrix representing how objects located in resolution cells between the (n−N+1)$^{th}$ cell and the (n+N−1)$^{th}$ cell reflect the signal s, the matrix A(n) being defined as:

$$A(n) = \begin{bmatrix} x(n) & \ldots & x(n+N-1) \\ & \ddots & \\ x(n-N+1) & \ldots & x(n) \end{bmatrix}$$

where x(n) may be an hypothetical true profile of the target located in the n$^{th}$ resolution cell. The step S2 may then comprises the following steps:
- a step S21 of calculating, based on $w^{(p-1)}$, an estimated profile $\hat{x}^{(p)}(n)$ of the target located in the n$^{th}$ resolution cell;
- a step S22 of calculating, based on s and $\hat{x}^{(p)}(n)$, the estimated filter $w^{(p)}$.

Preferably, during the step S21, $\hat{x}^{(0)}(n)=s^H\tilde{y}(n)$ and $\hat{x}^{(p)}(n)=w^{(p-1)H}(n)$ (12) if $1 \leq p \leq M$.

Preferably, during the step S22, the estimated filter may be calculated as follows:

$$w^{(p+1)}(n)=(\hat{C}^{(p)}(n)+B(n))^{-1}s\hat{\rho}^{(p)}(n)$$

where $\hat{\rho}^{(p)}(n)=E\{|\hat{x}^{(p)}(n)|^2\}=|\hat{x}^{(p)}(n)|^2$, $E\{.\}$ being the expected value;
where $$\hat{C}^{(p)}(n) = \sum_{m=-N+1}^{N-1} \hat{\rho}^{(v)}(n+m)s_m s_m^H,$$

$s_m$ containing the elements of s right-shifted by m samples, the m first elements being zero-filled;
where $B(n)=\{\tilde{b}(n)\tilde{b}^H(n)\}$.

Preferably, during the step S3, the estimated distortion $d^{(p)}$ may be calculated as follows:

$$d^{(p)} = \left( \sum_{n=0}^{L-1} \frac{1}{\hat{\rho}^{(p-1)}(n)} \hat{F}^{(p-1)}(n) + \frac{\alpha}{\|z\|^2} I \right)^{-1}$$

$$\sum_{n=0}^{L-1} \left( \left( w^{(p-1)}(n) - \frac{1}{\hat{\rho}^{(p-1)}(n)} \hat{F}^{(p-1)}(n)z \right) \right)$$

where $$\hat{F}^{(p-1)}(n) = \sum_{m=-N+1}^{N-1} \hat{\rho}^{(p-1)}(n-m) w_m^{(p-1)}(n) w_m^{(p-1)}(n)^H,$$

$w_m^{(p-1)}(n)$ containing the elements of $w^{(p-1)}(n)$ right-shifted by m samples, the m first elements being zero-filled, α being a predefined numeral and I being the identity matrix.

According to a second aspect, the present invention may provide a to method for filtering a signal y, the signal y being the reflection of a two-way radar antenna pattern s, the pattern s having been reflected by a target. The method comprises a step of receiving the signal y and a step of estimating a filter w to be applied to the signal y, the filter w being compensated for an unwanted and beforehand unknown distortion d in the pattern s.

Preferably, the target being located in a $n^{th}$ azimuth resolution cell of the radar, where n is an integer, the pattern s may be sampled, $s=[s_0 \ldots s_{N-1}]^T$ containing N samples in the azimuth dimension, N being an integer greater than or equal to 1, the sampled pattern s satisfying s=z+d where $z=[z_0 \ldots z_{N-1}]^T$ may be a reference template pattern and $d=[d_0 \ldots d_{N-1}]^T$ may be the unwanted distortion. The signal y may be a sampled signal $\tilde{y}(n)=[y(n) \ldots y(n+N-1)]^T$ containing N samples corresponding to the measurement of the signal y in N consecutive resolution cells following the $n^{th}$ cell. The filter w may be a set of N weighting factors. The filter w may be applied to y by calculating the convolution $w^H \tilde{y}(n)$.

Preferably, the step of estimating the filter w may comprise the following steps performed M times iteratively, M being an integer greater than or equal to 1 and p being an integer ranging from 1 to M:
- a step S1 of calculating, based on an estimated distortion $d^{(p-1)}$, a reference pattern $s^{(p)}$;
- a step S2 of iteratively calculating, based on $s^{(p)}$, an estimated filter $w^{(p)}$;
- a step S3 of calculating, based on $w^{(p)}$, an estimated distortion $d^{(p)}$;

the $M^{th}$ iteration of S3 providing $w^{(M)}=w$.

Preferably, during the step S1, $d^{(0)}=0$, $s^{(0)}=s$ and $s^{(p)}=s^{(p-1)}-d^{(p-1)}$ if $1 \leq p \leq M$.

Preferably, the antenna being rotating and the sampled signal $\tilde{y}(n)$ satisfying $\tilde{y}(n)=A^T(n)s+\tilde{b}(n)$, where $\tilde{b}(n)=[b(n) \ldots b(n+N-1)]^T$ may be a hypothetical sampled signal representing a thermal noise b collected from N consecutive resolution cells following the $n^{th}$ cell and A(n) may be a N×N matrix representing how objects located in resolution cells between the $(n-N+1)^{th}$ cell and the $(n+N-1)^{th}$ cell reflect the pattern s, the matrix A(n) being defined as:

$$A(n) = \begin{bmatrix} x(n) & \ldots & x(n+N-1) \\ & \ddots & \\ x(n-N+1) & \ldots & x(n) \end{bmatrix}$$

where x(n) may be an hypothetical true profile of the target located in the $n^{th}$ resolution cell, the step S2 may comprise the following steps:
- a step S21 of calculating, based on $w^{(p-1)}$, an estimated profile $\hat{x}^{(p)}(n)$ of the target located in the $n^{th}$ resolution cell;
- a step S22 of calculating, based on s and $\hat{x}^{(p)}(n)$, the estimated filter $w^{(p)}$.

Preferably, during the step S21, $\hat{x}^{(0)}(n)=s^H \tilde{y}(n)$ and $\hat{x}^{(p)}(n)=w^{(p-1)H}(n)\tilde{y}(n)$ if $1 \leq P \leq M$.

Preferably, during the step S22, the estimated filter may be calculated as follows:

$$w^{(p+1)}(n) = (\hat{C}^{(p)}(n)+B(n))^{-1} s \hat{\rho}^{(p)}(n)$$

where $\hat{\rho}^{(p)}(n)=E\{|\hat{x}^{(p)}(n)|^2\}=|\hat{x}^{(p)}(n)|^2$, $E\{.\}$ being the expected value;
where $$\hat{C}^{(p)}(n) = \sum_{m=-N+1}^{N-1} \hat{\rho}^{(v)}(n+m) s_m s_m^H,$$

$s_m$ containing the elements of s right-shifted by m samples, the m first elements being zero-filled;
where $B(n)=E\{\tilde{b}(n)\tilde{b}^H(n)\}$.

Preferably, during the step S3, the estimated distortion $d^{(p)}$ may be calculated as follows:

$$d^{(p)} = \left( \sum_{n=0}^{L-1} \frac{1}{\hat{\rho}^{(p-1)}(n)} \hat{F}^{(p-1)}(n) + \frac{\alpha}{\|z\|^2} I \right)^{-1}$$

$$\sum_{n=0}^{L-1} \left( \left( w^{(p-1)}(n) - \frac{1}{\hat{\rho}^{(p-1)}(n)} \hat{F}^{(p-1)}(n) z \right) \right)$$

where $$\hat{F}^{(p-1)}(n) = \sum_{m=-N+1}^{N-1} \hat{\rho}^{(p-1)}(n-m) w_m^{(p-1)}(n) w_m^{(p-1)}(n)^H,$$

$w_m^{(p-1)}(n)$ containing the elements of $w^{(p-1)}(n)$ right-shifted by m samples, the m first elements being zero-filled, α being a predefined numeral and I being the identity matrix.

For ease of reading, the invention is below described applied to a single dimension, for example range or azimuth. However, it is an advantage of the invention that it can easily be extended to multiple dimensions at the same time.

A non-limiting example of the invention is described below, with reference to the accompanying FIG. 1 and FIG. 2, which schematically illustrate the steps of an iterative method according to the invention.

The scheme according to the invention proposes, to deconvolve the received signal, to use the transmitted signal or antenna pattern, respectively in the range or azimuth dimension. The deconvolution is obtained by applying a filter based on modified Wiener filter. The filtering procedure is done iteratively on the original received signal sequence. The inner structure of the Wiener filter allows maximizing the signal-to-noise plus interference ratio, where targets in adjacent cells are the cause of the interference or masking of some weaker targets. The procedure is iterative. The scheme according to the invention may also be extended to include input samples from multiple scans, allowing for a recursive type of approach. The uncertainty can be tuned due to a feedback in the system, to contribute to determine the filter estimation selection to be applied for the deconvolution.

The scheme according to the invention requires a consistent data model including the dual sided problem: a known reference, such as a transmitted signal (for the range dimension) or an antenna pattern (for the azimuth dimension), and uncertainties and confidence on such knowledge. These concepts of uncertainty and confidence are a means to embrace in the model the effects of received modeling errors, environmental factors, and/or instrumental imperfections. Thus, the data model includes the received signal data model and the perturbation model.

The received signal is a sequence of samples in the range dimension (constant azimuth angle) or in the azimuth dimension (constant range cell). As illustrated by the equation (1), in case a target echoes the transmitted signal, the received signal model may advantageously consist of two terms: the target echo signal and the thermal noise.

$$\tilde{y}(n) = A^T(n)s + \tilde{b}(n) \quad (1)$$

where $\tilde{y}(n) = [y(n) \ldots y(n+N-1)]^T$ may be the received signal samples, $s = [s_0 \ldots s_{N-1}]^T$ may be the transmitted signal samples (or two-way antenna pattern), $\tilde{b}(n) = [b(n) \ldots b(n+N-1)]^T$ may be the thermal noise samples and $A(n)$ may be a circulant N×N matrix containing the target profile at each range (or azimuth) sample to perform convolution. The matrix $A(n)$ may be defined by:

$$A(n) = \begin{bmatrix} x(n) & \ldots & x(n+N-1) \\ & \ddots & \\ x(n-N+1) & \ldots & x(n) \end{bmatrix}$$

In the present example, the matrix $A(n)$ represents how objects located in resolution cells between the $(n-N+1)$th cell and the $(n+N-1)$th cell may reflect the signal s, each $x(n)$ being an hypothetical true profile of the target located in the $n^{th}$ resolution cell. The matrix A is analogously used to describe target profile convolution in the azimuth dimension when a rotating antenna is assumed. If s is critically sampled in equation (1), then each $x(n)$ corresponds to a bin equal to a resolution cell. If s is oversampled, then each $x(n)$ corresponds to less than a resolution cell. The first term, the target echo signal, is the sampled convolution of the target profile and the transmitted signal or two-way antenna pattern, correspondingly for the range and azimuth dimensions respectively. Each target echo signal is a product of a statistically described target coefficient and the transmitted signal or two-way antenna pattern, correspondingly for the range and azimuth dimensions respectively. Consequently the approach is statistical: it allows the possibility to include in the model prior knowledge of the target coefficient (mean amplitude, and/or correlation in the target profile). Such prior knowledge on the targets may be available from radar operation at previous scans. The thermal noise is assumed to be statistically distributed as zero-mean complex Gaussian process.

An approach according to the invention is here described. A perturbation model addresses the uncertainty on the template, which is the transmitted signal for the range domain, and the two-way antenna pattern for the azimuth domain. As illustrated by the following equation (2), the actual template may be equal to the sum of a reference template and a distortion term:

$$s = z + d \quad (2)$$

where $s = [s_0 \ldots s_{N-1}]^T$ may be the actual template, $z = [z_0 \ldots z_{N-1}]^T$ may be the reference template and $d = [d_0 \ldots d_{N-1}]^T$ may be the distortion term. The reference signal may be calculated according to the equation (2) in a first step S1, as illustrated by FIG. 1. The understanding of this model is to be the following. The reference template corresponds to the designed template or the result of calibration measurements. The actual template is the effective realization of the template, it can vary even over multiple scans due to varying operation conditions and/or signal distortion. The uncertainty term collects all causes of impairment in an additive term. The claim is that even if there is no particular physical explanation for the uncertainty term, it can be proved that the uncertainty term increases the robustness of the filter estimation technique. A perturbation ratio (PR) can be defined as in the equation (3):

$$PR = \frac{d^H d}{z^H z} \quad (3)$$

The PR measures the ratio of the average power in the distortion to the power of the reference template. A large value of PR means high uncertainty. Given the above described data model, a linear minimum mean square error (LMMSE) technique may be used to estimate and generate the filter to be applied on the received signal samples. The convolution of the filter and the received signal output leads to a filter output. Let the processing window be the desired output length, i.e. the target profile estimate. The iterative procedure generates outputs on narrower intervals with increasing iterations. Let m be the iteration number, m=1 being the initialization, and let L be the interval of interest or processing interval. At each iteration, the N samples at the extreme of the interval are used to improve the update in the central part of the interval. By construction, the final iteration has length L, as illustrated by the FIG. 2. A LMMSE technique is applied for each azimuth or range cell respectively in the azimuth or range dimension to determine the filter that minimizes the mean square error in such cell. The error is defined as the difference between the filter output and the true target profile. The problem that is assumed in this context is the minimization of the equation (4):

$$\min_{w,d} \frac{E\{|x(n) - w^H(n)\tilde{y}(n)|^2\}}{E\{|x(n)|^2\}} + \alpha \frac{\|s-z\|^2}{\|z\|^2} \quad (4)$$

where $w(n) = [w_0(n) \ldots w_{N-1}(n)]^T$ is a set of N weighting factors for filtering the $n^{th}$ sample. $E\{.\}$ is the expected value. Note that the second term is also a scalar since $\|.\|^2$ represents the squared norm of a vector: $\|d\|^2 = d^H d$. The terms at the denominator are normalization factors. This minimization problem leads to the cost function in equation (5):

$$J(n, w, d) = \frac{E\{|x(n) - w^H(n)\tilde{y}(n)|^2\}}{E\{|x(n)|^2\}} + \alpha \frac{\|s-z\|^2}{\|z\|^2} \quad (5)$$

It is possible to write the terms explicitly as illustrated in equation (6):

$$J(n, w, d) = \frac{E\left\{\begin{array}{c}|x(n)|^2 + w^H(n)\tilde{y}(n)\tilde{y}^H(n)w(n) - \\ x*(n)w^H(n)\tilde{y}(n) - x(n)\tilde{y}^H(n)w(n)\end{array}\right\}}{E\{|x(n)|^2\}} + \alpha \frac{\|d\|^2}{\|z\|^2} \quad (6)$$

This minimization problem gives the following sets of equations (7):

$$\begin{cases} \nabla_w \cdot J(n, w, d) = 0 \\ \nabla_d \cdot J(n, w, d) = 0 \end{cases} \quad (7)$$

where the gradient is assumed due to the complex variables involved.
Let $$d = \begin{bmatrix} d_{R.1} \\ \vdots \\ d_{R.N} \end{bmatrix} + j \begin{bmatrix} d_{I.1} \\ \vdots \\ d_{I.N} \end{bmatrix}.$$

The complex gradient can be defined as $$\nabla_{d^*}(J) = \frac{1}{2}\begin{bmatrix} \frac{\partial}{\partial d_{R.1}} \\ \vdots \\ \frac{\partial}{\partial d_{R.N}} \end{bmatrix} + j\frac{1}{2}\begin{bmatrix} \frac{\partial}{\partial d_{I.1}}J \\ \vdots \\ \frac{\partial}{\partial d_{I.N}}J \end{bmatrix}.$$

The first set of equations in (7) leads to an optimal filter illustrated in equation (8):

$$w(n) = (E\{\tilde{y}(n)\tilde{y}^H(n)\})^{-1} E\{\tilde{y}(n)x^*(n)\} \quad (8)$$

With the received signal modeled in equation (1), the filter can be rewritten as:

$$w(n) = (E\{A^T(n)ss^H A^*(n)\} + B(n))^{-1} E\{A^T(n)sx^*(n)\} \quad (9)$$

where $B(n) = E\{\tilde{b}(n)\tilde{b}^H(n)\}$. In the hypothesis that target profile samples are uncorrelated and equal to their realization, the equation (9) becomes the following equation (10):

$$w(n) = (C(n) + B(n))^{-1} \rho(n) s \quad (10)$$

where $E\{|x(n)|^2\} = |x(n)|^2 \stackrel{def}{=} \rho(n)$ and $$C(n) = \sum_{m=-N+1}^{N-1} \rho(n+m) s_m s_m^H$$

and $s_m$, contains the elements of s shifted by m samples and the remainder zero-filled, i.e. $s_2 = [0\ 0\ s_0\ \ldots\ s_{N-3}]^T$. Since the true target profile x(n) is not known, the procedure may be applied iteratively to obtain a better estimate on the central sequence of samples in the processing scheme, as illustrated by equation (11):

$$w^{(p+1)}(n) = (\hat{C}^{(p)}(n) + \hat{B}(n))^{-1} s\hat{\rho}^{(p)}(n) \quad (11)$$

where the sign ˆ indicates an estimate and the superscript p indicates a $p^{th}$ iteration. The filter output at the $p^{th}$ iteration may be given by the equation (12):

$$\hat{x}^{(p)}(n) = w^{(p-1)H}(n)\tilde{y}(n) \quad (12)$$

Figure 2:
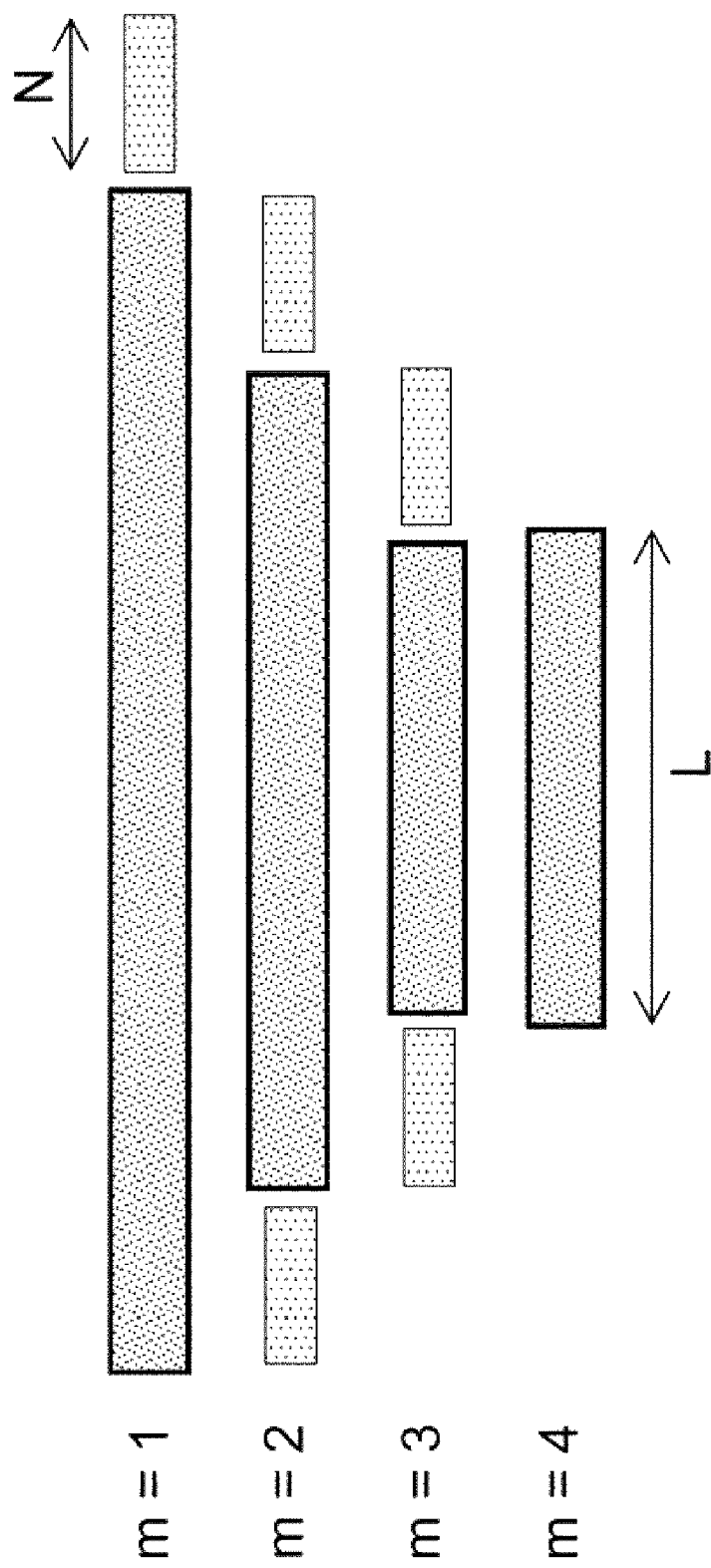
FIG. 2 illustrates iteration length as a function of iteration number, in accord with an embodiment of the invention.

The filter output may be calculated according to the equation (12) in a step S21, which is a sub-step of a step S2 of calculating the estimated filter, as illustrated by FIG. 1. The estimated filter itself may be calculated according to the equation (11) in a step S22 following the step S21, S22 being also a sub-step of the step S2, as illustrated by FIG. 1. Thus, the steps S21 and S22 are performed iteratively in a loop. In other words, the filter outputs at the extremes of the processing window at a previous iteration are used to improve in the current iteration the estimate of the target profile in the central part of the processing window. Consequently, it is assumed that given an input sequence for an interval in azimuth or range respectively, the filter output is a sequence of the same length. The central part of the output sequence is the output of several iterations, the outer parts are the output of fewer iterations and the extreme parts are the output of the initialization stage only. Each part has size N, which is also the filter length, number of samples of the transmitted signal or of antenna pattern template assumed respectively for the range and azimuth dimension. The same procedure can also be done starting from an input sequence that is longer than the processing window so that the output at the final iteration is of the size of the processing window. This solves the problem of strong scatterers outside the processing window with sidelobes within the processing window. The initialization may be done using the matched filter output, as illustrated by equation (13):

$$\hat{x}^{(0)}(n) = s^H \tilde{y}(n) \quad (13)$$

When explicitly writing out the dependencies of the actual template on the perturbation model, the filter in equation (9) can be rewritten as in equation (14):

$$w(n) = (K(n) + U(n) + B(n))^{-1} (E\{A^T(n)x(n)\}z + E\{A^T(n)dx^*(n)\}) \quad (14)$$

where:

$$C(n) = K(n) + U(n)$$

$$K(n) = E\{A^T(n)zz^H A^*(n)\}$$

$$U(n) = E\{A^T(n)dd^H A^*(n)\} + E\{A^T(n)zd^H A^*(n)\} + E\{A^T(n)dz^H A^*(n)\}$$

To solve the second set of equations in (7), it is necessary to explicitly write out the cost function in terms of the dependency in d. In the hypothesis that the noise and the target profile are uncorrelated the cost function simplifies to the equation (15):

$$J(n, w, d) = \quad (15)$$

$$\frac{1}{E\{|x(n)|^2\}}[E\{|x(n)|^2\} + E\{w^H(n)A^T(n)zz^H A^*(n)w(n)\} + + E\{w^H(n)A^T(n)dd^H A^*(n)w(n)\} + E\{w^H(n)A^T(n)zd^H A^*(n)w(n)\} + + E\{w^H(n)A^T(n)dz^H A^*(n)w(n)\} + E\{w^H(n)b(n)b^H(n)w(n)\} + -E\{x*(n)w^H(n)A^T(n)(z+d)\} -$$

$$E\{x(n)(z+d)^H A^*(n)w(n)\}] + \frac{\alpha d^H d}{\|z\|^2}$$

Regarding the derivation in d*, consider only the terms of the cost function contributing as illustrated in equation (16):

$$\nabla_{d^*} J(n, w, d) = \quad (16)$$

$$\frac{1}{E\{|x(n)|^2\}} E\{(w^H(n)A^T(n)d)A^*(n)w(n)\} + + \frac{1}{E\{|x(n)|^2\}} E$$

$$\{(w^H(n)A^T(n)z)A^*(n)w(n)\} - \frac{1}{E\{|x(n)|^2\}} E\{x(n)A^*(n)w(n)\} + \frac{\alpha d}{\|z\|^2}$$

By setting this equation (16) to zero, the disturbance vector is derived as illustrated in equation (17):

$$\frac{1}{E\{|x(n)|^2\}}[E\{(w^H(n)A^T(n)d)A^*(n)w(n)\} + \qquad (17)$$

$$E\{(w^H(n)A^T(n)z)A^*(n)w(n)\} + -E\{x(n)A^*(n)w(n)\}] + \frac{\alpha d}{\|z\|^2} = 0$$

The equation to solve in d is of the form of the equation (18):

$$aE\{h(n)(h^H(n)d)\} - E\{c(n)\} + bd = 0 \qquad (18)$$

where $$a = \frac{1}{E\{|x(n)|^2\}}$$

and $$b = \frac{\alpha}{\|z\|^2}$$

are scalars, $h^H(n) = w^H(n)A^T(n)^-$ and $$c(n) = \frac{1}{E\{|x(n)|^2\}} E\{x(n)h(n) - (h^H(n)z)h(n)\}.$$

Writing the equation (18) in matrix/vector notation gives the equation (19):

$$H'(n)d = c(n) \qquad (19)$$

where $H'(n) = a\, E\{h(n)h^H(n)\} + bI$, I being the identity matrix. Consequently the distortion vector is given by equation (20):

$$d = (H'(n))^{-1}c(n) \qquad (20)$$

Writing the equation (20) explicitly gives the equation (21):

$$d = \left(\frac{1}{E\{|x(n)|^2\}} E\{A^*(n)w(n)w^H(n)A^T(n)\} + \frac{\alpha}{\|z\|^2} I\right)^{-1} \cdot \frac{1}{E\{|x(n)|^2\}} \qquad (21)$$

$$E\{x(n)A^*(n)w(n) - (w^H(n)A^T(n)z)A^*(n)w(n)\}$$

In the assumption that the target profile samples are uncorrelated, and that the $$E\{|x(n)|^2\} = |x(n)|^2 \stackrel{def}{=} \rho(n),$$

the equation (21) becomes the equation (22):

$$d = \left(\frac{1}{\rho(n)}F(n) + \frac{\alpha}{\|z\|^2}I\right)^{-1}\left(w(n) - \frac{1}{\rho(n)}F(n)z\right) \qquad (22)$$

where $$F(n) = \sum_{m=-N+1}^{N-1} \rho(n-m)w_m(n)w_m^H(n)$$

and $w_m(n)$ contains the elements of w(n) shifted by m samples and the remainder zero-filled, i.e. $w_2(n) = [0\ 0\ w_0(n) \ldots w_{N-3}(n)]^T$.

Since the true target profile x(n) is not known, solving for d depends on the outputs from the solution of the first set of equations as in the first set of equations and the filter output at that iteration, which is the current target profile estimate. As (11) is generated iteratively, a value d can be generated each iteration, as illustrated in equation (23):

$$d^{(p+1)} = \left(\frac{1}{\hat{\rho}^{(p)}(n)}\hat{F}^{(p)}(n) + \frac{\alpha}{\|z\|^2}I\right)^{-1}\left(w^{(p)}(n) - \frac{1}{\hat{\rho}^{(p)}(n)}\hat{F}^{(p)}(n)z\right) \qquad (23)$$

Nevertheless the final iteration of (11) is used to obtain a better estimate of d. In equations (15) to (23), the dependency of d on the cell index n was not explicitly written, but as the cost function in (5) is function of n, also d in (20) is. Consequently (23) should be rewritten as:

$$d^{(p+1)}(n) = \left(\frac{1}{\hat{\rho}^{(p)}(n)}\hat{F}^{(p)}(n) + \frac{\alpha}{\|z\|^2}I\right)^{-1}\left(w^{(p)}(n) - \frac{1}{\hat{\rho}^{(p)}(n)}\hat{F}^{(p)}(n)z\right) \qquad (24)$$

Such a minimization algorithm outputs a value d for each cell index. It is also possible to obtain a single d for all L cells by modifying the cost function in (5) into the equation (25):

$$J(w,d) = \sum_{n=0}^{L-1} \frac{E\{|x(n) - w^H(n)\tilde{y}(n)|^2\}}{E\{|x(n)|^2\}} + \alpha\frac{\|s-z\|^2}{\|z\|^2} \qquad (25)$$

This new cost function does not change the results obtained for the first of equations in (7), since the derivation is still done in w(n). The second set of equations as obtained in this section can be accordingly changed, given the property of linearity. And consequently the equation (22) may become the equation (26):

$$d = \left(\sum_{n=0}^{L-1}\frac{1}{\rho(n)}F(n) + \frac{\alpha}{\|z\|^2}I\right)^{-1}\sum_{n=0}^{L-1}\left(\left(w(n) - \frac{1}{\rho(n)}F(n)z\right)\right) \qquad (26)$$

and according to the equation (23), the equation (27) may come:

$$d^{(p+1)} = \qquad (27)$$

$$\left(\sum_{n=0}^{L-1}\frac{1}{\hat{\rho}^{(p)}(n)}\hat{F}^{(p)}(n) + \frac{\alpha}{\|z\|^2}I\right)^{-1}\sum_{n=0}^{L-1}\left(\left(w^{(p)}(n) - \frac{1}{\hat{\rho}^{(p)}(n)}\hat{F}^{(p)}(n)z\right)\right)$$

The distortion term may be calculated according to the equation (27) in a third step S3 following the step S2, as illustrated by FIG. 1. Thus, the steps S1, S2 and S3 are performed iteratively in a loop.

An algorithm to estimate and compensate for the distortion may structured as follows. In presence of distortion, the algorithm as in the first set of equations may be applied, given as input the reference template. The initialization is given by the matched filter. The matched filter output is used as a target profile estimate for the first iteration, and it is inserted in equation (11) to obtain the filters w(n). The target profile estimate that is obtained as output of this first-iteration filters will be used in the following iteration. The algorithm works at each iteration on reducing number of samples, as N samples at the each of the extremes of the interval of the current target profile estimate are used to improve the filter estimate through C(n) in equation (11). The selection of the number of iterations M is done beforehand, and it determines what is the length in samples of the final output profile. A small M between 2 and 5 has shown to be sufficient for unmasking the targets.

The scheme described for the filter generation and target profile estimate may be applied both in presence or absence of distortion. In case of distortion present, the algorithm is run once, the target profile from the second to last iteration is used as target profile estimate and the filter generated at the last iteration is used in equation (27). A vector d is obtained and inserted in equation (2), generating a new s. This s will be the new reference signal s used in equation (11). The filter and target profile generating algorithm is then run anew with this new reference. It is worth noting that the algorithm may also be applied only on a segment of the entire data as if to zoom in on the target profile estimate where a strong response is present in the matched filter output. This solution reduces the amount of processing necessary.

The application of the LMMSE filtering to the azimuth dimension allows unmasking of targets and separation of targets spaced closer that the −3 dB beamwidth, without increasing the dimensions of the antenna. The interpolated algorithm allows for avoiding the loss due to target mismatch. There is a much faster convergence with respect to an iterated CLEAN algorithm to the correct target profile in case of grouped target scenarios. In case of similar power targets with spacing closer than the −3 dB beamwidth, the targets can still be solved with the LMMSE algorithm, while the output of CLEAN is giving an incorrect target profile in location and amplitude. The distortion estimation and compensated algorithm according to the invention enable to solve the effects of the artefacts due to incorrect knowledge of the transmitted waveform or antenna pattern, respectively in the two dimensions, thus increasing the robustness. Mismatching of the target, such as also occur for extended targets or target not at the center of a range or azimuth cell, can be solved by interpolation techniques.

Regarding the feasibility of the algorithm, such an iterative scheme allows to have available also the target profile estimate at intermediate iterations, and consequently allows for real-time applications. Moreover it can be shown that the number of iterations required is low (below five) and consequently overall non intractable. The number of iterations is independent of the number of targets, but is dependent on the Signal-to-Noise Ratio (SNR) gap between stronger and weaker targets. The larger the SNR gap is, the better target unmasking is achieved by a larger number of iterations. The scheme according to the invention generates a filter that maximizes the output SNR in the case of a single target, leading to an expected output SNR equal to the one of the matched filter.

In the case of multiple targets, it maximizes the signal-to-noise plus interference ratio, as it is derived from the Wiener filter. All interference between targets is not cancelled, but it produces an estimate of the target profile with minimal deviation, which is very relevant. The iterative procedure is required to improve the estimate of the target profile, which is fed to the filter-estimating algorithm; consequently the estimated filter is improved in the mean square error sense, as an output of the filter-estimation algorithm. The algorithm is also made robust to deviation of the reference known at the receiver from the actual template "filtering" the echoes.

The invention claimed is:

1. A method for use in a radar for filtering a received signal, the received signal being a signal emitted by the radar and reflected by a target, the target being at a location corresponding to an $n^{th}$ range resolution cell of the radar, the method comprising the following steps:
    transmitting a sampled signal $s=[s_0 \ldots s_{N-1}]^T$ containing N samples in a range dimension, N being an integer greater than or equal to 1, the sampled signal s satisfying $s=z+d$ where $z=[z_0 \ldots z_{N-1}]^T$ is a reference template signal and $d=[d_0 \ldots d_{N-1}]^T$ is unwanted distortion;
    using the radar to receive a signal y, the signal y being a sampled signal $\tilde{y}(n)=[y(n) \ldots y(n+N-1)]^T$ containing N samples corresponding to a measurement of the signal y in N consecutive resolution cells following the $n^{th}$ cell; and
    applying a filter w to the signal y, w being a set of N weighting factors, wherein w is applied to y by calculating the convolution $w^H \tilde{y}(n)$;
    wherein determining the filter w comprises performing the following steps M times, M being an integer greater than or equal to 1 and p being an integer ranging from 1 to M:
    a step S1 of calculating, based on an estimated distortion $d^{(p-1)}$, a reference signal $s^{(p)}$;
    a step S2 of calculating, based on $s^{(p)}$, an estimated filter $w^{(p)}$; and
    a step S3 of calculating, based on $w^{(p)}$, an estimated distortion $d^{(p)}$;
    the $M^{th}$ iteration of S3 providing $w^{(M)}=w$.

2. A method according to claim 1, wherein during the step S1, $d^{(0)}=0$, $s^{(0)}=s$ and $s^{(p)}=s^{(p-1)}-d^{(p-1)}$ if $1 \leq p \leq M$.

3. A method according to claim 1, wherein the sampled signal $\tilde{y}(n)$ satisfies $\tilde{y}(n)=A^T(n)s+\tilde{b}(n)$, where $\tilde{b}(n)=[b(n) \ldots b(n+N-1)]^T$ is a hypothetical sampled signal representing a thermal noise b collected from N consecutive resolution cells following the $n^{th}$ cell and A(n) is an N×N matrix representing how objects located in resolution cells between the $(n-N+1)^{th}$ cell and the $(n+N-1)^{th}$ cell reflect the signal s, the matrix A(n) being defined as:

$$A(n) = \begin{bmatrix} x(n) & \ldots & x(n+N-1) \\ & \ddots & \\ x(n-N+1) & \ldots & x(n) \end{bmatrix}$$

where x(n) is a hypothetical true profile of the target located in the $n^{th}$ resolution cell, the method being characterized in that the step S2 comprises the following steps:
    a step S21 of calculating, based on $w^{(p-1)}$, an estimated profile $\hat{x}^{(p)}(n)$ of the target located in the $n^{th}$ resolution cell; and
    a step S22 of calculating, based on s and $\hat{x}^{(p)}(n)$, the estimated filter $w^{(p)}$.

4. A method according to claim 3, wherein during the step S21, $\hat{x}^{(0)}(n)=s^H\tilde{y}(n)$ and $\hat{x}^{(p)}(n)=w^{(p-1)^H}(n)\tilde{y}(n)$ if $1\leq p\leq M$.

5. A method according to claim 3, wherein during the step S22, the estimated filter is calculated as follows:

$$w^{(p+1)}(n)=(\hat{C}^{(p)}(n)+B(n))^{-1}s\,\hat{\rho}^{(p)}(n)$$

where $\hat{\rho}^{(p)}(n)=E\{|\hat{x}^{(p)}(n)|^2\}=|\hat{x}^{(p)}(n)|^2$, $E\{.\}$ being the expected value;
where $$\hat{C}^{(p)}(n) = \sum_{m=-N+1}^{N-1} \hat{\rho}^{(p)}(n+m)s_m s_m^H,$$

$s_m$ containing the elements of s right-shifted by m samples, the m first elements being zero-filled; and
where $B(n)=E\{\tilde{b}(n)\tilde{b}^H(n)\}$.

6. A method according to claim 1, wherein during the step S3, the estimated distortion $d^{(p)}$ is calculated as follows:

$$d^{(p)} = \left(\sum_{n=0}^{L-1} \frac{1}{\hat{\rho}^{(p-1)}(n)}\hat{F}^{(p-1)}(n) + \frac{\alpha}{\|z\|^2}I\right)^{-1}$$

$$\sum_{n=0}^{L-1}\left(\left(w^{(p-1)}(n) - \frac{1}{\hat{\rho}^{(p-1)}(n)}\hat{F}^{(p-1)}(n)z\right)\right)$$

where $$\hat{F}^{(p-1)}(n) = \sum_{m=-N+1}^{N-1} \hat{\rho}^{(p-1)}(n-m)w_m^{(p-1)}(n)w_m^{(p-1)}(n)^H,$$

$w_m^{(p-1)}(n)$ containing the elements of $w^{(p-1)}(n)$ right-shifted by m samples, the m first elements being zero-filled, $\alpha$ being a predefined numeral and I being the identity matrix.

7. A method for use in a radar for filtering a received signal, the received signal being a reflection of a transmitted signal off of a target, the target being located in an $n^{th}$ azimuth resolution cell of the radar, where n is an integer, the method comprising the following steps:
transmitting a sampled pattern $s=[s_0 \ldots s_{N-1}]^T$ containing N samples in the azimuth dimension, an integer greater than or equal to 1, the sampled pattern s satisfying $s=z+d$ where $z=[z_0 \ldots z_{N-1}]^T$ is a reference template pattern and $d=[d_0 \ldots d_{N-1}]^T$ is unwanted distortion;
using the radar to receive a signal y, the signal v being a sampled signal $\tilde{y}(n)=[y(n) \ldots y(n+N-1)]^T$ containing N samples corresponding to the measurement of the signal y in N consecutive resolution cells following the $n^{th}$ cell; and
applying a filter w to the signal y, the filter w being a set of N weighting factors, wherein w is applied to y by calculating the convolution $w^H\tilde{y}(n)$;
wherein determining the filter w comprises performing the following steps M times, M being an integer greater than or equal to 1 and p being an integer ranging from 1 to M:
a step S1 of calculating, based on an estimated distortion $d^{(p-1)}$, a reference pattern $s^{(p)}$;
a step S2 of calculating, based on $s^{(p)}$, an estimated filter $w^{(p)}$; and
a step S3 of calculating, based on $w^{(p)}$, an estimated distortion $d^{(p)}$;
the $M^{th}$ iteration of S3 providing $w^{(M)}=w$.

8. A method according to claim 7, wherein during the step S1, $d^{(0)}=0$, $s^{(0)}=s$ and $s^{(p)}=s^{(p-1)}-d^{(p-1)}$ if $1\leq p\leq M$.

9. A method according to claim 7, wherein an antenna of the radar includes a rotating antenna, and the sampled signal $\tilde{y}(n)$ satisfies $\tilde{y}(n)=A^T(n)s+\tilde{b}(n)$, where $\tilde{b}(n)=[b(n) \ldots b(n+N-1)]^T$ is a hypothetical sampled signal representing a thermal noise b collected from N consecutive resolution cells following the $n^{th}$ cell and A(n) is an N×N matrix representing how objects located in resolution cells between the $(n-N+1)^{th}$ cell and the $(n+N-1)^{th}$ cell reflect the pattern s, the matrix A(n) being defined as:

$$A(n) = \begin{bmatrix} x(n) & \ldots & x(n+N-1) \\ & \ddots & \\ x(n-N+1) & \ldots & x(n) \end{bmatrix}$$

where x(n) is a hypothetical true profile of the target located in the $n^{th}$ resolution cell, the method being characterized in that the step S2 comprises the following steps:
a step S21 of calculating, based on $w^{(p-1)}$, an estimated profile $\hat{x}^{(p)}(n)$ of the target located in the $n^{th}$ resolution cell; and
a step S22 of calculating, based on s and $\hat{x}^{(p)}(n)$, the estimated filter $w^{(p)}$.

10. A method according to claim 9, wherein during the step S21, $\hat{x}^{(0)}(n)=s^H\tilde{y}(n)$ and $\hat{x}^{(p)}(n)=w^{(p-1)^H}(n)\hat{y}(n)$ if $1\leq p\leq M$.

11. A method according to claim 9, wherein during the step S22, the filter is calculated as follows:

$$w^{(p+1)}(n)=(\hat{C}^{(p)}(n)+B(n))^{-1}s\hat{\rho}_{(p)}(n),$$

where $\hat{\rho}^{(p)}(n)=E\{|\hat{x}^{(p)}(n)|^2\}=|\hat{x}^{(p)}(n)|^2$, $E\{.\}$ being the expected value;
where $$\hat{C}^{(p)}(n) = \sum_{m=-N+1}^{N-1} \hat{\rho}^{(p)}(n+m)s_m s_m^H,$$

$s_m$ containing the elements of s right-shifted by m samples, the m first elements being zero-filled; and
where $B(n)=E\{\tilde{b}(n)\tilde{b}^H(n)\}$.

12. A method according to claim 7, wherein during the step S3, the estimated distortion $d^{(p)}$ is calculated as follows:

$$d^{(p)} = \left(\sum_{n=0}^{L-1} \frac{1}{\hat{\rho}^{(p-1)}(n)}\hat{F}^{(p-1)}(n) + \frac{\alpha}{\|z\|^2}I\right)^{-1}$$

$$\sum_{n=0}^{L-1}\left(\left(w^{(p-1)}(n) - \frac{1}{\hat{\rho}^{(p-1)}(n)}\hat{F}^{(p-1)}(n)z\right)\right)$$

where $$\hat{F}^{(p-1)}(n) = \sum_{m=-N+1}^{N-1} \hat{\rho}^{(p-1)}(n-m) w_m^{(p-1)}(n) w_m^{(p-1)}(n)^H,$$

$w_m^{(p-1)}(n)$ containing the elements of $w^{(p-1)}(n)$ right-shifted by m samples, the m first elements being zero-filled, $\alpha$ being a predefined numeral and I being the identity matrix.

\* \* \* \* \*